US007904528B2

(12) United States Patent
Zilliacus et al.

(10) Patent No.: US 7,904,528 B2
(45) Date of Patent: *Mar. 8, 2011

(54) APPARATUS AND ASSOCIATED METHOD FOR DOWNLOADING AN APPLICATION WITH A VARIABLE LIFETIME TO A MOBILE TERMINAL (75) Inventors: Martin Zilliacus, Kauniainen (FI); Gabor Kaszonyi, Budapest (HU)

(73) Assignee: Nokia Corporation, Espoo (FI)

( * ) Notice: Subject to any disclaimer, the term of this patent is extended or adjusted under 35 U.S.C. 154(b) by 1125 days.

This patent is subject to a terminal disclaimer.

(21) Appl. No.: 10/981,475

(22) Filed: Nov. 5, 2004

(65) Prior Publication Data

US 2005/0083877 A1    Apr. 21, 2005

Related U.S. Application Data (63) Continuation of application No. 10/777,284, filed on Feb. 11, 2004, which is a continuation of application No. 09/470,303, filed on Dec. 22, 1999, now Pat. No. 6,832,230.

(51) Int. Cl.
*G06F 15/16* (2006.01)
(52) U.S. Cl. ............... 709/217; 705/51; 705/54; 705/57; 705/59
(58) Field of Classification Search .................. 709/203, 709/217–219; 705/50, 59, 403, 405, 51, 705/57; 455/405, 414; 707/10, 203, 205
See application file for complete search history.

(56) References Cited

U.S. PATENT DOCUMENTS

| 4,757,533 | A |   | 7/1988  | Allen et al.          |
|-----------|---|---|---------|-----------------------|
| 4,893,248 | A |   | 1/1990  | Pitts et al.          |
| 5,548,645 | A |   | 8/1996  | Ananda                |
| 5,615,373 | A |   | 3/1997  | Ho                    |
| 5,649,187 | A |   | 7/1997  | Hornbuckle            |
| 5,689,560 | A |   | 11/1997 | Cooper et al.         |
| 5,708,709 | A | * | 1/1998  | Rose ............ 705/59 |
| 5,857,020 | A |   | 1/1999  | Peterson, Jr.         |
| 5,940,504 | A | * | 8/1999  | Griswold ........ 705/59 |
| 5,953,005 | A |   | 9/1999  | Liu                   |
| 6,005,938 | A |   | 12/1999 | Banker et al.         |
| 6,008,737 | A |   | 12/1999 | Deluca et al.         |
| 6,009,401 | A |   | 12/1999 | Horstmann             |

(Continued)

FOREIGN PATENT DOCUMENTS

EP           0778512           6/1997

(Continued)

OTHER PUBLICATIONS

EP Search Report of EP 00660234 dated Nov. 22, 2005.

(Continued)

*Primary Examiner* — Duyen M Doan
(74) *Attorney, Agent, or Firm* — Banner & Witcoff, Ltd.

(57) ABSTRACT

Apparatus, and associated method, provides for downloading an application with a selectable lifetime from an application database to a mobile terminal. The mobile terminal user's identification information and the selected lifetime for the application are stored in an application-license database. When the user seeks to download the same application on a subsequent occasion the user is able to download that application for a reduced fee if lifetime remains from when the application was first downloaded. In addition, the application may be configured to delete or uninstall itself from the mobile terminal when the selected lifetime for the application expires.

71 Claims, 4 Drawing Sheets

U.S. PATENT DOCUMENTS

| | | | |
|---|---|---|---|
| 6,021,492 | A | 2/2000 | May |
| 6,026,375 | A | 2/2000 | Hall et al. |
| 6,034,621 | A | 3/2000 | Kaufman |
| 6,075,862 | A | 6/2000 | Yoshida et al. |
| 6,134,593 | A | 10/2000 | Alexander et al. |
| 6,154,745 | A | 11/2000 | Kari et al. |
| 6,272,333 | B1 | 8/2001 | Smith |
| 6,349,257 | B1 | 2/2002 | Liu et al. |
| 6,356,543 | B2 | 3/2002 | Hall et al. |
| 6,366,791 | B1 * | 4/2002 | Lin et al. .................. 455/567 |
| 6,385,591 | B1 * | 5/2002 | Mankoff .................. 705/14 |
| 6,385,655 | B1 * | 5/2002 | Smith et al. .................. 709/232 |
| 6,502,124 | B1 | 12/2002 | Shimakawa |
| 6,512,919 | B2 | 1/2003 | Ogasawara |
| 6,522,875 | B1 | 2/2003 | Dowling et al. |
| 6,574,239 | B1 | 6/2003 | Dowling et al. |
| 6,795,925 | B2 | 9/2004 | Colvin |
| 6,829,593 | B1 | 12/2004 | Ritter et al. |
| 6,832,230 | B1 * | 12/2004 | Zilliacus et al. .................. 707/203 |
| 6,898,708 | B2 | 5/2005 | Hori |
| 6,947,535 | B2 | 9/2005 | Ginzboorg et al. |
| 7,080,051 | B1 | 7/2006 | Crawford |
| 2004/0117664 | A1 | 6/2004 | Colvin |
| 2004/0160911 | A1 * | 8/2004 | Zilliacus et al. .................. 370/328 |
| 2004/0243610 | A1 | 12/2004 | Ishiguro |
| 2005/0081042 | A1 | 4/2005 | Venkatesan et al. |
| 2005/0188228 | A1 | 8/2005 | DeMello et al. |

FOREIGN PATENT DOCUMENTS

| | | |
|---|---|---|
| EP | 0 809 221 | 11/1997 |
| EP | 0817103 | 1/1998 |
| EP | 0836132 | 4/1998 |
| GB | 2332126 | 6/1999 |
| JP | 10143357 | 5/1998 |
| WO | 9301550 | 1/1993 |
| WO | 9842098 | 9/1998 |
| WO | 9957875 | 11/1999 |

OTHER PUBLICATIONS

Communication dated Apr. 4, 2007 for EP 00 660 234.6-1245.

Kiniry, et al., "A Hands-on Look at Java Mobile Agents", IEEE 1997, pp. 21-30.

European Search Report for Application Serial No. 00660234.6-1245, dated Mar. 18, 2009.

* cited by examiner

APPARATUS AND ASSOCIATED METHOD FOR DOWNLOADING AN APPLICATION WITH A VARIABLE LIFETIME TO A MOBILE TERMINAL

This application is a continuation of U.S. patent application Ser. No. 10/777,284, filed Feb. 11, 2004 and titled "Apparatus and Associated Method for Downloading an Application with a Variable Lifetime to a Mobile Terminal," which application is a continuation of U.S. patent application Ser. No. 09/470,303, filed Dec. 22, 1999 and also titled "Apparatus and Associated Method for Downloading an Application with a Variable Lifetime to a Mobile Terminal." The contents of said applications are incorporated by reference herein.

FIELD OF THE INVENTION

This invention relates to an apparatus and method for downloading content to a mobile terminal with communication capabilities.

BACKGROUND OF THE INVENTION

Recent years have witnessed the emergence and proliferation of the Internet, the World Wide Web ("WWW"), mobile communication technologies and mobile computing devices. As technology advances, telecommunications and computing are converging. Convergence is producing devices that communicate over networks and integrate media, telephony and computing.

Cellular communication networks, for example, allow subscribers to communicate both voice and nonvoice data. Typically, a subscriber pays a fee to obtain a subscription to a cellular network allowing the subscriber to use the network. The subscriber uses a mobile terminal to communicate on the cellular network. As technology advances, mobile terminals are increasingly constructed to be contained in smaller packages and also to provide greater functionality. One example, of a "mobile terminal" is the rapidly proliferating "cell phone."

The same technological advances that have fostered the proliferation of the cell phone have also fostered great advancements in computing devices. Computing devices are becoming increasingly smaller, faster, and more mobile. Technological advancement in computing devices and mobile terminals is blurring the line between them. Mobile terminals are integrating more and more capability typically associated with conventional computing devices. For example, cell phones are now able to run software applications and provide Internet access. Accordingly, the term "mobile terminal" shall herein refer to a broad range of devices (e.g. Personal Digital Assistants ("PDA"), Communicators, Smart Phones, and Personal Computers ("PC")) and not solely devices operable merely to communicate in a cellular communication system.

Mobile terminals utilize a range of processing circuitry to perform the functions described herein. The processing circuitry is generally capable of running, i.e., executing, content, also referred to herein as an application program. The terms content and application programs shall be used interchangeably herein and shall each refer to digital information. Content, executable or otherwise usable by the processing circuitry is typically stored at a memory device which is accessible by the processing circuitry. Downloading content to a mobile terminal is regularly performed. Oftentimes content is downloaded to a mobile terminal directly or indirectly utilizing the WWW. If an application is downloaded directly the mobile terminal has the capability to connect directly to the WWW. Whereas, if content is downloaded to a mobile terminal indirectly utilizing an intermediate device such as a PC is used. A Nokia 9000 Series™, for example, permits the downloading of content thereto by way of a cable or infrared connection from a source, such as a personal computer.

As noted above, existing mobile terminals are capable of receiving content downloaded thereto. Increased amounts of, and types of, content shall likely be available to be downloadable to a mobile terminal in the future. Some, and perhaps much, of such content is private-domain content. That is to say, an owner, or other entity, has property rights in such content, and is entitled to payment for use of such content. Convenient manners by which to market, distribute and pay for such content are needed.

Software application providers are using numerous pricing models to provide applications over the WWW to PC users. These models range from providing applications at no cost to full cost. "Freeware," as the term implies, refers to an application that a PC user is able to obtain without any payment. With freeware the user has full rights to the software, including the source code. Linux is an example of a freeware product. Some application providers do sell freeware, typically on a Compact Disk Read Only Memory ("CD-ROM"). However, the freeware is bundled with installation help programs and additional software. It is the packaging and additional software that is being paid for, not the freeware itself which is free by default.

"Shareware" is a term that refers to applications that PC users have full rights to at a low price. Typically, however, the payment is voluntary and sent directly to the developers of the application. In addition to freeware and shareware, some applications are simply sold at full price. Full price applications, are purchased by credit card or other money transaction and are fully functional from the start. The application is normally downloaded after the payment transaction has been processed.

In addition to the various pricing models discussed above for users to obtain applications, the functionality of downloaded applications can be restricted in several ways. "Time limited" applications are applications that are only usable for a certain time after which they become non-functional. Time limited applications generally are associated with an unlocking code wherein the user obtains the code when the purchase price is paid for and is then able to unlock the application, making it functional for a determined time. Transaction limited applications, are only functional for a set number of uses or starts. Like time limited applications, transaction limited operations generally operate with an unlocking code.

In contrast to time limited and transaction limited applications, limited functionality applications are first obtained for free or for a low price by a user with some key functions disabled. After paying the full price the disabled functions may be enabled or the fully functional application downloaded from the WWW. Limited dataset applications contain an incomplete dataset. Games are often available in a limited dataset where only the first level is available to the user. The limited dataset application is generally freeware, however, use of the complete dataset—the additional levels—requires payment of the purchase price.

In the environment of mobile terminals as compared to PC's unique problems are encountered with downloading applications that require new solutions. Ease of payment and user satisfaction are key considerations when determining how best to provide downloadable applications to mobile terminals. Possible payment methods include charging for the application along with the monthly bill, electronic cash, credit card charge and monthly membership fee. These payment methods along with those described herein for PC users (i.e. freeware, shareware, full-price, and time-limited applications) present special problems when implemented for mobile terminals.

The various methods of distributing applications to PC users discussed above were developed in the PC environment. Mobile terminals, however, provide unique problems not encountered with traditional PCs. For example, current mobile terminals typically have less memory available for applications than current PCs. Current mobile terminal applications such as downloadable ringing tones are much less complex than typical PC applications. Accordingly, a mobile phone application cannot typically motivate a user to pay a price anywhere near PC application prices.

With any application PC, Mobile terminator otherwise, consumers would enjoy the ability to test or try out a new application without paying full price. Accordingly, a manner by which to permit a user to download and application for a limited time, pay a small price, and test or try out the application is desirable. In addition, mobile terminals generally have much less memory capacity, at the current time, than PC applications. Because of limited memory capacity, a user or the mobile terminal itself may have to eliminate an old application in memory to make room for a new application in memory. If a consumer has paid full price for several applications that do not fit in the memory of the users mobile terminal that user will not be willing to pay for the applications that do not fit. Therefore, a manner by which to permit a user to pay for an application once but be able to download that application on subsequent occasions for a reduced fee or at no cost would be desirable. Moreover, the installing and deinstalling of applications should be as simple and or automatic as possible providing the mobile terminal with an uncomplicated seamless experience. Accordingly, there is a need for new manners by which to provide applications to mobile terminals. The invention herein solves these problems.

SUMMARY OF THE INVENTION

An embodiment of the present invention provides a method that records user identity when downloading an application from a server to a mobile phone so that application later can be downloaded again without separate charge. An embodiment of the present invention also provides a method by which an application with limited lifetime on the mobile phone can uninstall itself and thus free memory space for new applications. The terms delete and uninstall are used interchangeably herein.

One embodiment of the present invention is an apparatus for a communication system. The communication system comprises a mobile terminal capable of communicating by way of a radio link with network infrastructure. The mobile terminal comprises memory for at least one application. The apparatus comprises an application database, a detector and an application-license database. The application database is coupled to the network infrastructure and contains at least a first application downloadable to the mobile terminal. The application(s) in the application database have a selectable lifetime during which the application is executable. In addition, the applications may be configured to delete or uninstall themselves from memory of the mobile terminal when their lifetime expires. The applications may be preprogrammed to delete themselves according to a preset lifetime or configured to delete themselves after the lifetime is selected. The lifetime may be calculated on time or transaction basis.

The detector is coupled to the network infrastructure and detects requests generated by the mobile terminal for downloading an application to the mobile terminal for a selected lifetime. The application-license database is also coupled to the network infrastructure and is configured to store the selected lifetime for the application. By storing the selected lifetime in the application-license database the user may download the same application at a later time for a lesser fee than originally paid for the application, if the lifetime for the application has not expired. The lesser fee includes paying no fee for subsequent downloads.

Another embodiment of the present invention is a method for downloading an application to a mobile terminal from an application database containing at least a first application. The application has a selectable lifetime during which the application is executable. The lifetime may be preprogrammed in the application or programmed in the application after the lifetime is selected. When the user of the mobile terminal chooses an application to download, the user also selects the lifetime for that application during which the application is executable. The lifetime may be determined on a transaction or time basis. The application is then downloaded to the mobile terminal from an application database. The user's identification and lifetime selection is also stored in an application-license database.

When the application is downloaded to the mobile terminal it may be configured to delete itself or uninstall itself from memory of the mobile terminal when the lifetime expires. In addition, the user may be required to pay a fee for the application when it is first downloaded. However, because the user selects, and may pay for, a lifetime and that lifetime is stored in the application-license database the user is able to download the same application at a later time for a reduced fee or no fee depending on the lifetime remaining for the application.

DETAILED DESCRIPTION

Figure 1:
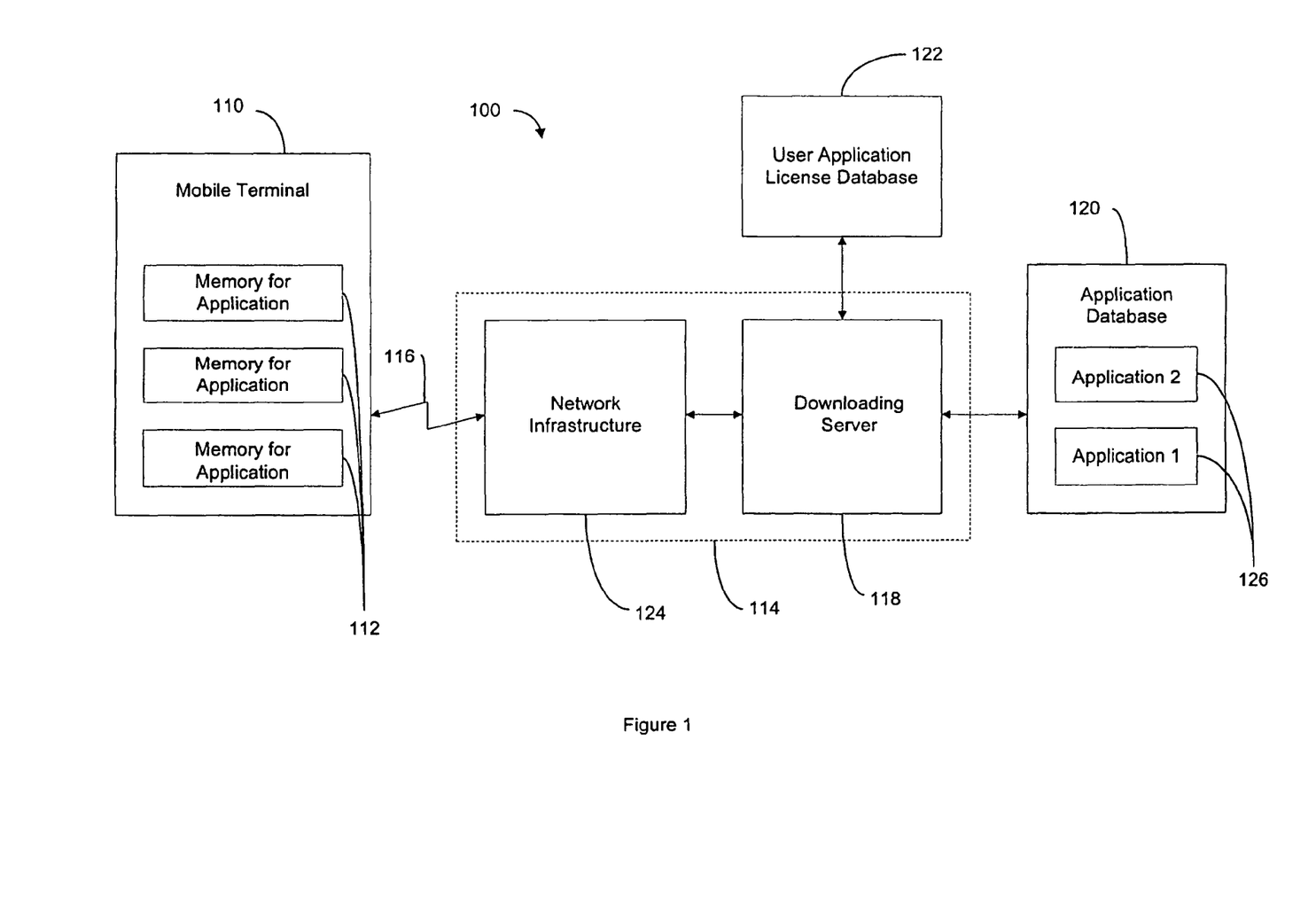
FIG. 1 illustrates a functional block diagram comprising the devices and modules of a communication system in which an embodiment of the present invention is operable.

Referring first to FIG. 1, a communication system, shown generally at 100, provides for communications with a mobile terminal 110. Within the mobile terminal 110 is at least one memory unit 112 for storing an application. The mobile terminal 110 is connected to a network 114 by way of communication path, here a radio link 116. The network 114 comprises network infrastructure 124 and a downloading server 118. The network infrastructure 124 comprises various hardware devices and associated software for receiving and processing signals transmitted upon the radio link 116 by the mobile terminal. In the exemplary implementation in which the network 114 is a cellular communication network, the signals form electromagnetic signals.

The network infrastructure 124 is connected to a downloading server 118. The downloading server 118 and, in turn, the network infrastructure 124 is connected to both an application database 120 and an application-license database 122. The application-license database 122 comprises data about each mobile terminal users application licenses. The application-license database 122 is accessible by the downloading server 118 whenever a mobile terminal user attempts to download an application. The application-license database 122 stores individual mobile terminal users' application licensing information including lifetime selections. The lifetime selections are discussed below along with FIGS. 3 and 4.

The application database 120 stores various applications 126. The applications 126 are available for downloading to the mobile terminal 110 via the downloading server 118 and other necessary network infrastructure 114.

Figure 2:
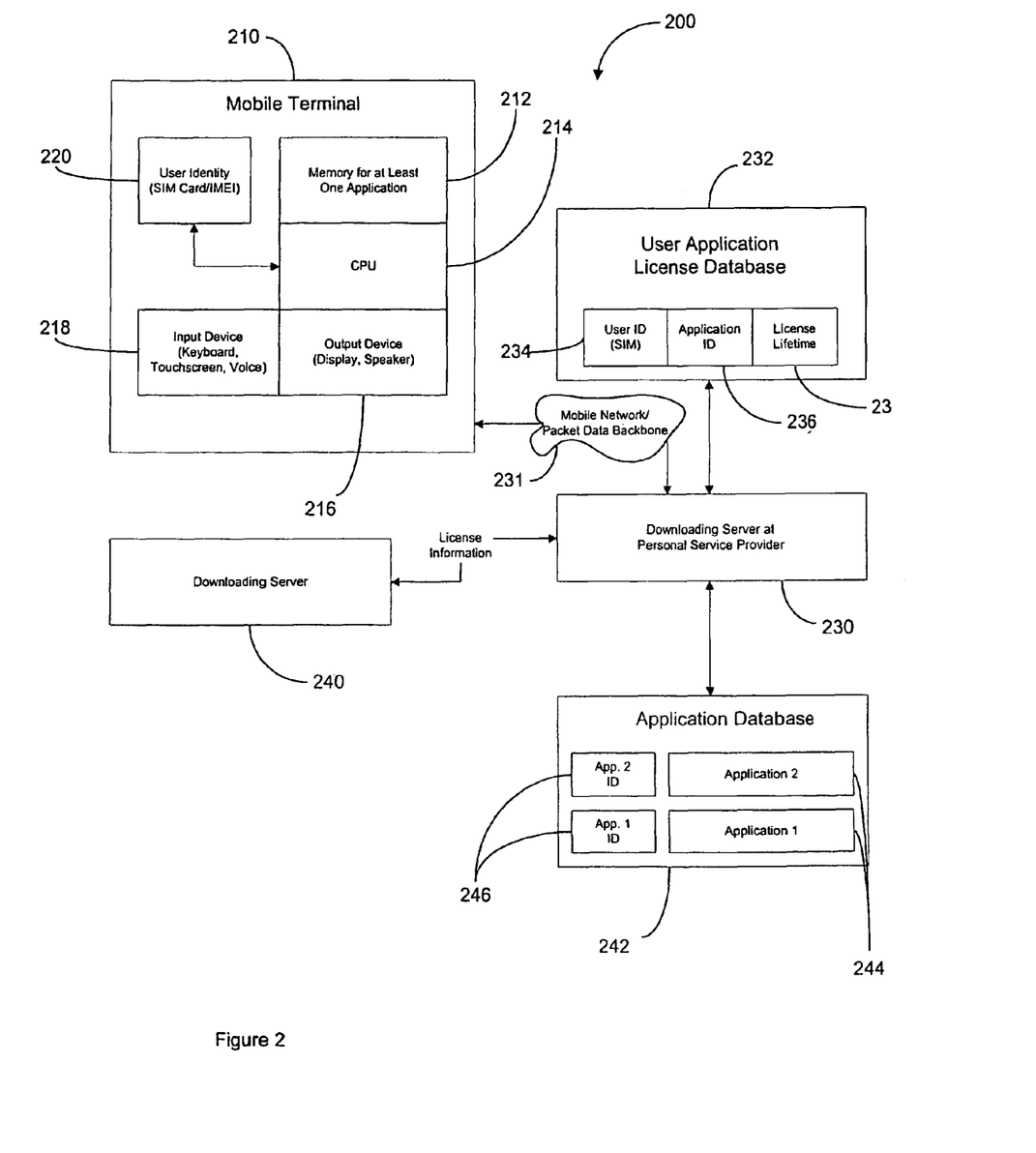
FIG. 2 illustrates another functional block diagram of the communication system shown in FIG. 1 here further illustrating the devices and modules used during operation of an embodiment of the present invention.

Referring to FIG. 2, a communication system, here shown generally at 200, again provides for communications with a mobile terminal, here mobile terminal 210. The mobile terminal 210 comprises an input device 218, an output device 216, a Central Processing Unit ("CPU") 214, memory for at least one application 212 and a user identity module 220. The range of possible input devices 218 includes, e.g., a keyboard, a touchscreen and a voice recognition module. The range of possible output devices 216 includes, e.g., a display screen and a speaker.

The user identity module 220, in the exemplary implementation, is formed of a Subscriber Identity Module ("SIM") at which an International Mobile Equipment Identity ("IMEI") is stored. Both the SIM and the IMEI are specified in the Global System for Mobile Communication ("GSM") technical standards. Although this specification refers to GSM devices, it is not intended to be limited to GSM devices. In a GSM network the user's subscription identity to the network is contained in the SIM. The SIM allows the GSM network to identify the mobile terminal user. The SIM is linked to a user's subscription to the GSM network and not a particular mobile terminal and therefore may be used with different mobile terminals. A GSM mobile terminal is identified by the IMEI. An IMEI is a unique 15-digit number. The SIM in conjunction with the IMEI identify the user and the user's mobile terminal to the GSM network.

The mobile terminal 210 is able to communicate with a downloading server 230 at the personal service provider by way of a mobile network and packet data backbone 231. The server 230 is linked to an application-license database 232 and an application database 242. The application-license database comprises user identification information 234, user application selections 236 and application lifetime information 238. The user identification information 234 may comprise both SIM and IMEI information. The application selections 236 may comprise both current and past application selections. The application lifetime information 238 is discussed further below along with FIGS. 3 and 4.

The application database 242 contains the applications available for downloading to the mobile terminal. The application database 242 comprises at least one application 244 and an application identifier 246 associated with the application. Two applications, application 1 and application 2, are shown in the FIGS. 1 and 2 for purposes of example.

In the case of a mobile terminal user having a subscription to a particular cellular network, that user communicates by way of the mobile network, as part of the subscription, and the packet data backbone 231. The user, however, may communicate over other networks for a fee or change subscriptions. Moreover, a user may desire to download applications while using another network. Accordingly, in the exemplary implementation, the packet data backbone portion of the mobile network and backbone 231 is a public backbone, such as the Internet backbone so that the license information stored in the user application database 232 is accessible in other manners through the public backbone.

Figure 3:
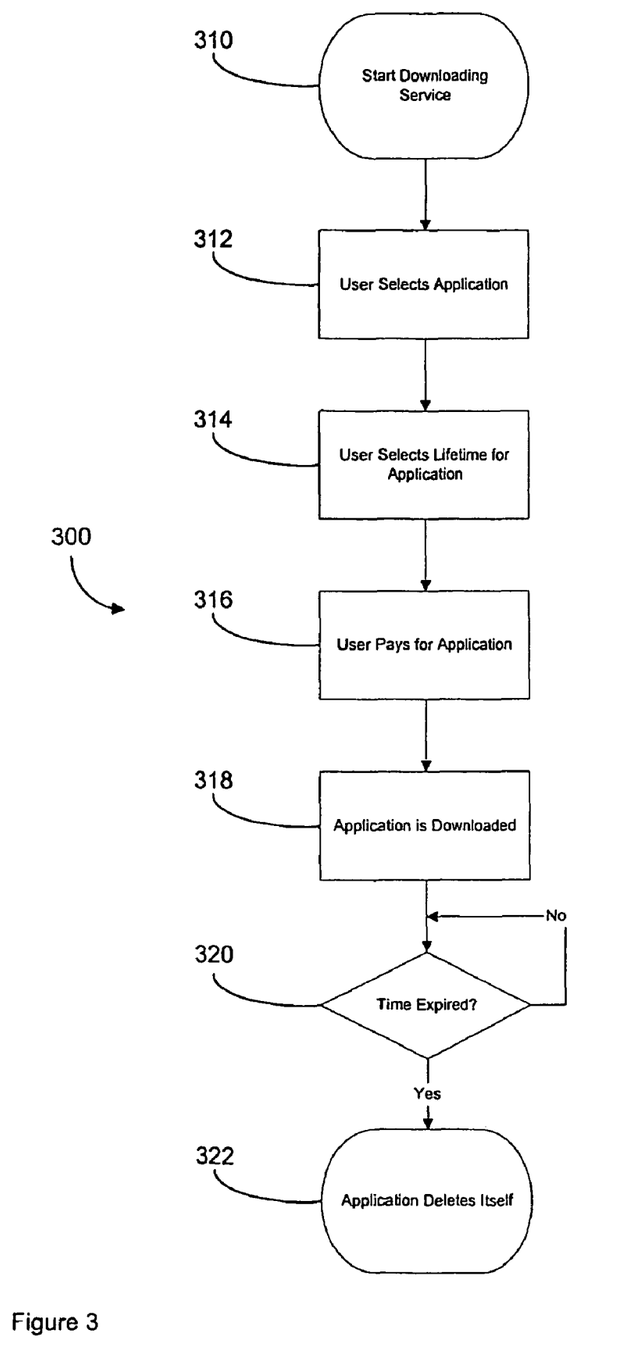
FIG. 3 illustrates a flowchart describing the operation of an embodiment of the present invention.

Referring to FIG. 3, a flowchart, shown generally at 300, illustrates operation of one embodiment of the present invention. At block 310 a mobile terminal user starts a downloading service. A downloading service provides applications for mobile terminals. The downloading service may be accessed directly by the mobile terminal, indirectly from a PC or otherwise. A downloading service is oftentimes implemented in the form of a website, either commercial or non commercial. The website provides links to various applications available for download. If the downloading service is run indirectly on a PC, the application is first downloaded to the PC. The mobile terminal must then allow the downloading of the application from the PC to the mobile terminal. Downloading from a PC to a mobile terminal, for example, is implemented in a Nokia 9000 Series™ mobile terminal by way of a cable or infrared connection.

At block 312, the user chooses an application. Choosing an application, in the case of a website implemented downloading service, may be achieved by selecting the link to that application. After clicking the link to an application, at block 314 the user selects a lifetime for the application. The lifetime represents the time during which the application will be executable and/or the time during which the application will reside in the memory of the mobile terminal. The application chosen is automatically configured, before downloading, to cease functioning or delete itself from the memory of the mobile terminal after the selected lifetime expires.

The user, at block 314 has a plurality of choices for lifetimes. The price of the application, at block 316, may be dependent on the selected lifetime. For example, use of the application three times may be free, use of the application ten times or for one week may be $2.00, use of the application 100 times or for a month may be $5.00 and use of the application for an unlimited amount of time may be $10.00.

At block 316, the user pays for the application. The payment price may be dependent on the selected lifetime. For example, if the user selects a lifetime of one week the user pays $2.00. After the application is paid for, the application is downloaded to the mobile terminal at block 318. The lifetime of the application may be tracked by the application itself, by the downloading service or otherwise. If the application tracks its own lifetime, the application is automatically configured at downloading to delete itself according to the user's selected lifetime. In the example above the application would automatically delete itself after one week. If the user had selected ten uses instead of one week, the application would automatically delete itself after ten uses.

Deletion comprises freeing all memory space used by the application and corresponding data or only freeing some specified portion of the memory space used by the application. For example, when the lifetime expires the application deletes its own executable code, however, the application's corresponding data and libraries are not deleted. If the application is customized by the mobile terminal user, the customized settings are retained even after the application deletes itself. Accordingly, if the same application is downloaded on a subsequent occasion the user's customized settings are retained.

At block 320, the application determines if it's lifetime has expired. If so, the application deletes itself at block 322. If not, the application does not delete itself and allows the user to continue using the application.

Figure 4:
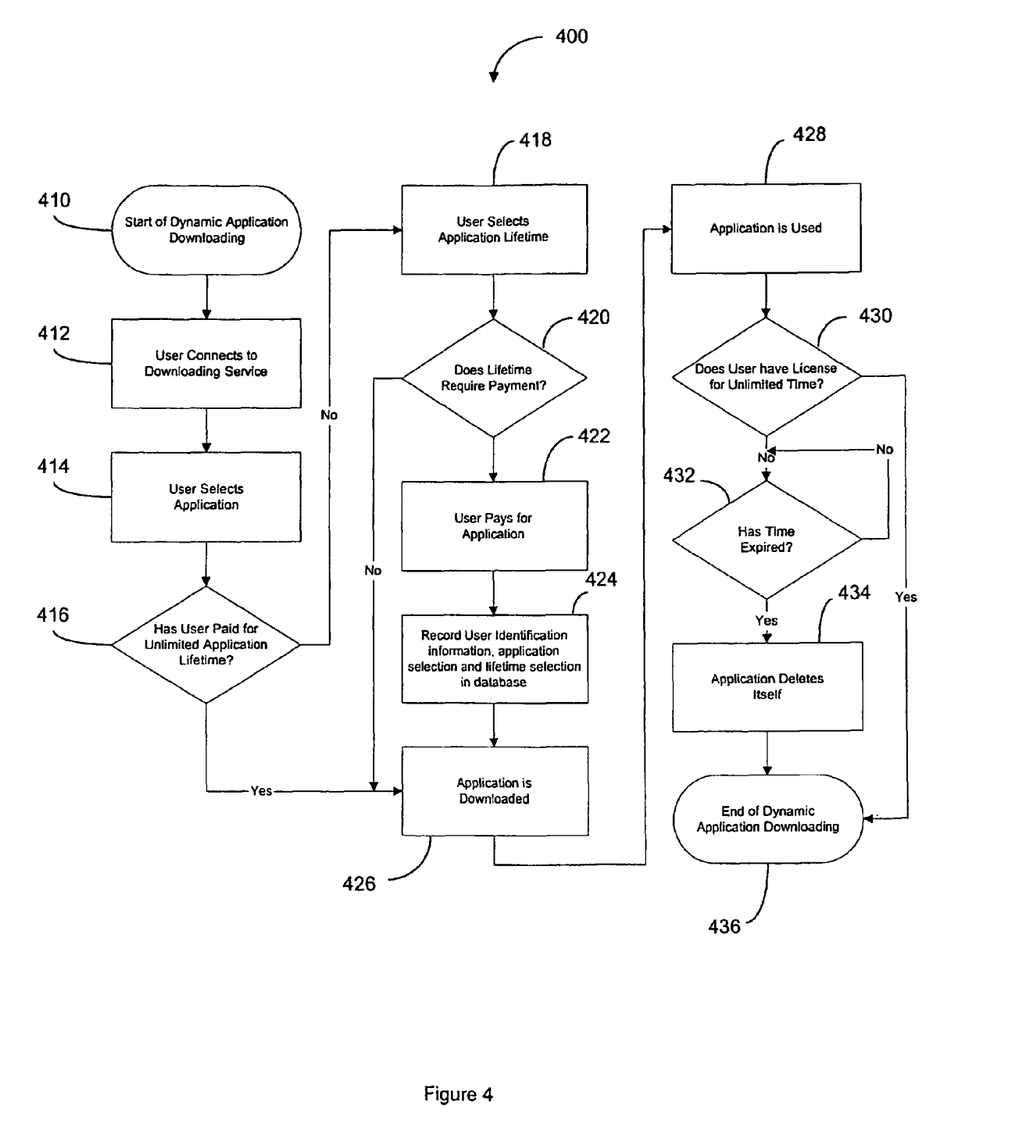
FIG. 4 illustrates another flowchart describing the operation of a further embodiment of the present invention.

Referring to FIG. 4, reference numeral 400 refers to another flowchart illustrating further operation of an embodiment of the present invention. At block 410 a dynamic application downloading sequence is started. The first operation is connecting to a downloading service at block 412. As mentioned earlier in conjunction with the description of FIG. 3, the downloading service may run directly on the user's mobile terminal, indirectly on a PC or otherwise. The downloading service may be accessed through a website. The website provides links to various applications available for download. If the downloading service is run indirectly on a PC, the mobile terminal must allow the downloading of the application from the PC to the mobile terminal. This may be achieved by way of a cable or infrared connection between the PC and the mobile terminal.

The user's identity information (e.g. SIM and IMEI information) is also supplied to the downloading service. If the downloading service is run directly on the mobile terminal, the user's identity information SIM information and IMEI information is automatically transmitted to the downloading service. If the downloading service is run directly on the mobile terminal, the user's identity information is automatically transmitted to the downloading service. The user identity information is then stored in the application-license database 122 or 232, referring to FIGS. 1 and 2 respectively.

At block 414, the user selects an application. If the downloading service is implemented in a website, the user selects the link to that application. The downloading service then determines if the user has previously paid for an unlimited application lifetime at block 416. For example, referring to FIG. 2, the downloading service through the downloading server 230 will compare the user's identity 220 to user identification information 234 in the application-license database 232. If there is a match between the current user identity 220 and user identity information 234 in the database, a further comparison is made to determine the licensing information 236, 238 for the user. The license-database 232 keeps track of a particular users current and past application selections and the lifetime for those applications. If the user previously paid for an unlimited application lifetime the license-database 232 will contain that information. If the user has previously paid for an unlimited lifetime the application is downloaded at block 426 without a reduced fee or without a fee for the application. Note, because the user has paid for an unlimited lifetime the user may be able to download the application to multiple mobile terminals—wherever he or she has plugged in their SIM card.

Block 416 may be modified to determine if the user has lifetime remaining from a previously paid for application, even if the user has not paid for an unlimited application lifetime. This is especially important in current mobile terminals with little memory available for applications. If a user needs to download an application to his or her mobile terminal when there is no memory available to store the application, the user will have to delete an existing application or an application may be deleted automatically to make room for the new application. The deleted application may have lifetime remaining. Accordingly, the license-database 232 stores the application lifetimes 238 for each application a particular user has selected. If at block 416 the downloading service determines that life remains from a previous selection of the application, the application is downloaded to the user's mobile terminal 110 at block 426 and stored in a memory element 112. When an application is downloaded to a mobile terminal 110 at block 416 with lifetime remaining, the application is configured to automatically delete itself from the memory 112 of the mobile terminal 110 when the remaining lifetime expires.

If the user has not paid for an unlimited lifetime on a previous occasion or does not have lifetime remaining from a previous selection, the user must now select the desired lifetime for the application at block 418. Available lifetimes correspond to different payment requirements. At block 420 the downloading service determines if the selected lifetime requires payment. For example, use of the application three times or for a week may be free whereas use of the application ten times or for a month may be $2.00. If the lifetime selected does not require payment the application is downloaded to the user's mobile terminal 110 at block 426 and stored in memory 112. If the application does require payment the user pays for the application at block 422. Payment methods include credit card charging, electronic cash, monthly fee or membership, and charging along with network subscription and use payments (e.g. the cell phone bill). The application, before downloading at block 426, is automatically configured to delete itself when the selected lifetime 418 expires.

At block 424 the downloading service records the user's identification information in the application-license database 232. As discussed earlier, the user identification information includes the application selection, and application lifetime selection for the user. In a GSM network, the user identification information will also include SIM and IMEI information. After the user has paid for the application at block 422 and the user's information is recorded at block 424, the selected application is downloaded to the user's mobile terminal 110 and stored in memory 112 at block 426. Downloading may occur directly to the mobile terminal or indirectly to a PC or otherwise. If indirectly, the application must then be downloaded from the PC to the mobile terminal using some type of link such as an infrared connection or a cable.

If during the selection process and downloading process represented by blocks 412 through 426, it is determined that there is insufficient memory for a new application there are several possible results. First, the downloading operation may be cancelled either automatically or manually by the user. Second, the user may choose to remove an existing application from his or her mobile terminal. In the latter case, if the user has selected to remove an application with lifetime remaining the user can later download this application at a reduced cost or at no cost if the user does so while lifetime remains for the deleted application. The ability to download an application with remaining lifetime is discussed above in reference to block 416.

Once the application is downloaded at block 426 the user may use the application 428. Each time the user subsequently attempts to use the application, the application queries itself to determine if it has an unlimited lifetime 430. If the application determines that it doesn't have an unlimited lifetime, the application determines if its lifetime has expired at block 432. If the lifetime has not expired, the user may use the application. If the lifetime has expired, the application automatically deletes itself at block 434.

The apparatus and method described herein provides a manner by which a mobile terminal user may download an application to a mobile terminal and select a lifetime for that application. By storing the user's identity, application selection and lifetime selection in a license-database that is accessible by a downloading service, the user is able to download the same application to a mobile terminal on subsequent occasions for a reduced fee. Moreover, the application deletes itself automatically from the mobile terminals memory after its lifetime expires. The features of this invention provide a convenient manner by which to obtain applications and try applications for a limited time. Moreover, the features of this invention provide a convenient manner by which to free-up memory in a mobile terminal by deleting an application and then obtaining the deleted application later on without having to pay twice for the application.

The invention also provides a convenient manner by which to obtain applications on an as needed basis. The user can then effectively use many more applications than would otherwise be possible if the applications had to permanently reside in the mobile terminal memory or be paid for every time they were downloaded to the mobile terminal. This feature is especially important given the portable nature of mobile terminals.

The previous descriptions are of preferred examples for implementing the invention, and the scope of the invention should not necessarily be limited to this description. The scope of the invention is defined by the following claims.

The invention claimed is:

1. A method comprising:
   receiving, via a wireless network from a mobile terminal having an associated user, a user-specified choice of a first application, the first application being one of a plurality of applications;
   receiving from the mobile terminal via the wireless network a user-specified variable lifetime for the first application;
   transmitting the first application via the wireless network to the mobile terminal associated with the user, the first application being configured to become unavailable for use on the mobile terminal upon expiration of the user-specified variable lifetime, wherein the user-specified variable lifetime comprises one of a time period specified by the user of the mobile terminal or a number of uses of the first application specified by the user of the mobile terminal;
   receiving first payment for the first application;
   receiving a subsequent re-choice of the first application;
   determining whether time remains in the user-specified time period;
   again transmitting the first application to the mobile terminal if the determining step results in a determination of time remaining in the user-specified time period; and
   receiving additional payment for said again transmitting the first application, wherein the amount of said additional payment is reduced from the amount of the first payment.

2. The method of claim 1, wherein the wireless network is a cellular communication network.

3. The method of claim 1, wherein the wireless network comprises short-range wireless communication.

4. The method of claim 3, wherein the short-range wireless communication comprises an infrared connection.

5. The method of claim 1, wherein the mobile terminal comprises a cellular telephone.

6. The method of claim 1, wherein the first application is configured to become unavailable by becoming non-functional.

7. The method of claim 1, wherein the first application is configured to become unavailable by automatically deleting at least a portion of itself.

8. The method of claim 7, wherein the first application is configured to delete only executable code.

9. The method of claim 7, wherein the first application is configured to retain customized settings in the mobile terminal.

10. The method of claim 1, further comprising:
    receiving a subsequent re-choice of the first application from the user of the mobile terminal;
    ascertaining whether time remains in the user-specified variable lifetime; and
    again transmitting the first application to the mobile terminal if the ascertaining step results in a determination of time remaining in the user-specified variable lifetime.

11. The method of claim 1, further comprising:
    receiving a subsequent re-choice of the first application;
    ascertaining whether the first application has been used less than the user-specified number of uses; and
    again transmitting the first application to the mobile terminal if the ascertaining step results in a determination that the first application has been used less than the user-specified number of uses.

12. The method of claim 1, wherein the amount of said payment is based on either the user-specified time period or the user-specified number of uses.

13. The method of claim 1, further comprising:
    receiving second payment for the first application;
    receiving a subsequent re-choice of the first application;
    ascertaining whether the first application has been used less than the user-specified number of uses;
    re-transmitting the first application to the mobile terminal if the ascertaining step results in a determination of use of the first application less than the user-specified number of uses; and
    receiving additional payment for said re-transmitting the first application, wherein the amount of said additional payment is reduced from the amount of the second payment.

14. The method of claim 1, wherein the first application is configured to:
    determine, each time the user attempts to use the first application, whether time remains in the user-specified time period, and
    delete itself if time does not remain in the user-specified time period.

15. The method of claim 1, wherein the first application is configured to:
    determine, each time the user attempts to use the first application, whether the first application has been used less than the user-specified number of uses, and
    delete itself if the first application has been used the user-specified number of uses.

16. The method of claim 1, wherein said receiving step comprises receiving the choice of the first application as a result of the user selecting a link at a website.

17. The method of claim 1, further comprising:
    storing data regarding the user and the first application in an application-license database.

18. The method of claim 17, wherein the data stored in the application-license database includes one of the user-specified time period and the user-specified predetermined number of uses.

19. The method of claim 1, wherein said transmitting step includes transmitting the first application from storage in an application database.

20. The method of claim 1, wherein the first application is a game.

21. The method of claim 1, wherein the first application contains executable digital information.

22. A method comprising:
    receiving from a user of a mobile terminal a choice of a first application, the first application being one of a plurality of applications;
    storing data regarding the user and the first application in an application license database;

transmitting the first application via a network to the mobile terminal, the first application being configured to become unavailable for use on the mobile terminal upon either expiration of a time period specified by the user of the mobile terminal, or use of the first application a number of times specified by the user of the mobile terminal;

determining whether the first application has been used less than the number of times specified by the user of the mobile terminal; and again transmitting the first application to the mobile terminal if the determining step results in a determination of use of the first application less than the number of times specified by the user of the mobile terminal.

23. The method of claim 22, further comprising:
ascertaining whether time remains in the time period specified by the user of the mobile terminal device; and
again transmitting the first application to the mobile terminal if the ascertaining step results in a determination of time remaining in the time period specified by the user of the mobile terminal.

24. The method of claim 22, wherein the mobile terminal comprises a cellular telephone.

25. The method of claim 22, wherein the first application is configured to become unavailable by becoming non-functional.

26. The method of claim 22, wherein the first application is configured to become unavailable by automatically deleting at least a portion of itself.

27. A method comprising:
receiving, via a wireless network from a mobile terminal having an associated user, a user-specified choice of a first ringing tone, the first ringing tone being one of a plurality of ringing tones;
transmitting the first ringing tone via the wireless network to the mobile terminal associated with the user, the first ringing tone being configured to become unavailable for use on the mobile terminal upon either
expiration of a time period specified by the user of the mobile terminal, or
use of the first ringing tone a number of times specified by the user of the mobile terminal;
receiving first payment for the first ringing tone;
receiving a subsequent re-choice of the first ringing tone;
determining whether time remains in the user-specified time period;
again transmitting the first ringing tone to the mobile terminal if the determining step results in a determination of time remaining in the user-specified time period; and
receiving additional payment for said again transmitting the first ringing tone, wherein the amount of said additional payment is reduced from the amount of the first payment.

28. The method of claim 27, wherein the wireless network is a cellular network.

29. The method of claim 27, wherein the wireless network comprises short-range wireless communication.

30. The method of claim 29, wherein the short-range wireless communication comprises an infrared connection.

31. The method of claim 27, wherein the mobile terminal comprises a cellular telephone.

32. The method of claim 27, further comprising:
receiving a subsequent re-choice of the first ringing tone;
ascertaining whether time remains in the user-specified time period; and again transmitting the first ringing tone to the mobile terminal if the ascertaining step results in a determination of time remaining in the predetermined time period.

33. The method of claim 27, further comprising:
receiving a subsequent re-choice of the first ringing tone;
ascertaining whether the first ringing tone has been used less than the user-specified number of times; and
again transmitting the first ringing tone to the mobile terminal if the ascertaining step results in a determination of use of the first ringing tone less than the user-specified number of times.

34. The method of claim 27, further comprising:
receiving payment for the first ringing tone, wherein the amount of said payment is based on either the user-specified time period or the user-specified number of times.

35. The method of claim 27, further comprising:
receiving second payment for the first ringing tone;
receiving a subsequent re-choice of the first ringing tone;
ascertaining whether the first ringing tone has been used less than the user-specified number of times;
re-transmitting the first ringing tone to the mobile terminal if the ascertaining step results in a determination of use of the first ringing tone less than the user-specified number of times; and
receiving additional payment for said re-transmitting the first ringing tone, wherein the amount of said additional payment is reduced from the amount of the second payment.

36. The method of claim 27, wherein said receiving step comprises receiving the choice of the first ringing tone as a result of the user selecting a link at a website.

37. The method of claim 27, further comprising:
storing data regarding the user and the first ringing tone in an application-license database.

38. The method of claim 37, wherein the data stored in the application-license database includes one of the user-specified time period and the user-specified number of times.

39. The method of claim 27, wherein said transmitting step includes transmitting the first ringing tone from storage in an application database.

40. A method comprising:
receiving a user-specified choice of a first ringing tone, the first ringing tone being one of a plurality of ringing tones;
storing data regarding the user and the first ringing tone in an application license database;
transmitting the first ringing tone via a network to a mobile terminal associated with the user, the first ringing tone being configured to become unavailable for use on the mobile terminal upon either
expiration of a time period specified by the user of the mobile terminal, or
use of the first ringing tone a number of times specified by the user of the mobile terminal,
determining whether time remains in the time period specified by the user of the mobile terminal; and
again transmitting the first ringing tone to the mobile terminal if the determining step results in a determination of time remaining in the time period specified by the user of the mobile terminal.

41. The method of claim 40, further comprising:
ascertaining whether the first ringing tone has been used less than the number of times specified by the user of the mobile terminal; and again transmitting the first ringing tone to the mobile terminal if the ascertaining step results in a determination of use of the first ringing tone less than the user-specified number of times.

42. The method of claim 40, wherein the mobile terminal comprises a cellular telephone.

43. The method of claim 40, wherein the first ringing tone is configured to become unavailable by becoming non-functional.

44. The method of claim 40, wherein the first ringing tone is configured to become unavailable by automatically deleting at least a portion of itself.

45. Apparatus comprising:
a downloading server comprising a link to one or more databases; and
a network infrastructure comprising a link to a mobile network,
wherein the downloading server is configured to perform:
receiving a user-specified choice of a first application, the first application being one of a plurality of applications stored in one of the databases,
transmitting the first application via the mobile network to a mobile terminal, the first application being configured to become unavailable for use on the mobile terminal upon either
expiration of a time period specified by a user associated with the mobile terminal, or
use of the first application a number of times specified by the user associated with the mobile terminal,
receiving first payment for the first application,
receiving a subsequent re-choice of the first application,
determining whether time remains in the user-specified time period,
again transmitting the first application to the mobile terminal if the determining step results in a determination of time remaining in the user-specified time period, and
receiving additional payment for said again transmitting the first application, wherein the amount of said additional payment is reduced from the amount of the first payment.

46. The apparatus of claim 45, wherein the mobile network is a cellular communication network.

47. The apparatus of claim 45, wherein the mobile network comprises short-range wireless communication.

48. The apparatus of claim 47, wherein the short-range wireless communication comprises an infrared connection.

49. The apparatus of claim 45, wherein the downloading server is configured to receive the user-specified choice from a cellular telephone.

50. The apparatus of claim 45, wherein the first application is configured to become unavailable by becoming non-functional.

51. The apparatus of claim 45, wherein the first application is configured to become unavailable by automatically deleting at least a portion of itself.

52. The apparatus of claim 51, wherein the first application is configured to delete only executable code.

53. The apparatus of claim 51, wherein the first application is configured to retain customized settings in the mobile terminal.

54. The apparatus of claim 45, wherein the downloading server is further configured to perform:
receiving a subsequent re-choice of the first application,
ascertaining whether time remains in the user-specified time period, and
again transmitting the first application to the mobile terminal if the ascertaining step results in a determination of time remaining in the user-specified time period.

55. The apparatus of claim 45, wherein the downloading server is further configured to perform:
receiving a subsequent re-choice of the first application,
ascertaining whether the first application has been used less than the user-specified number of times, and
again transmitting the first application to the mobile terminal if the ascertaining step results in a determination of use of the first application less than the user-specified number of times.

56. The apparatus of claim 45, wherein the downloading server is further configured to receive payment for the first application, and wherein the amount of said payment is based on either the user-specified time period or the user-specified number of times.

57. The apparatus of claim 45, wherein the downloading server is further configured to perform:
receiving second payment for the first application,
receiving a subsequent re-choice of the first application,
ascertaining whether the first application has been used less than the user-specified number of times,
re-transmitting the first application to the mobile terminal if the ascertaining step results in a determination of use of the first application less than the user-specified number of times, and
receiving additional payment for said re-transmitting the first application, wherein the amount of said additional payment is reduced from the amount of the second payment.

58. The apparatus of claim 45, wherein the first application is configured to:
determine, each time a user attempts to use the first application, whether time remains in the user-specified time period, and
delete itself if time does not remain in the user-specified time period.

59. The apparatus of claim 45, wherein the first application is configured to:
determine, each time a user attempts to use the first application, whether the first application has been used less than the user-specified number of times, and
delete itself if the first application has been used the user-specified number of times.

60. The apparatus of claim 45, wherein said receiving step comprises receiving the choice of the first application as a result of a user selecting a link at a website.

61. The apparatus of claim 45, wherein the first application is a ringing tone.

62. The apparatus of claim 45, wherein the first application is a game.

63. The apparatus of claim 45, wherein the first application contains executable digital information.

64. The apparatus of claim 45, wherein the downloading server is further configured to perform:
storing data regarding a user of the first application and the first application in an application-license database.

65. The apparatus of 64, wherein the data stored in the application-license database includes one of the user-specified time period and the user-specified number of times.

66. The apparatus of claim 45, wherein said transmitting step includes transmitting the first application from storage in an application database.

67. Apparatus comprising:
a downloading server comprising a link to an application license database;

a network infrastructure comprising a link to a network, wherein the apparatus is configured to perform receiving a user-specified choice of a first application, the first application being one of a plurality of applications, storing data regarding the user and the first application in the application license database, transmitting the first application via the network to a mobile terminal associated with the user, the first application being configured to become unavailable for use on the mobile terminal upon either expiration of a time period specified by a user of the mobile terminal, or use of the first application a number of times specified by the user of the mobile terminal, determine whether time remains in the user-specified time period, and again transmit the first application to the mobile terminal if the determining step results in a determination of time remaining in the user-specified time period.

68. The apparatus of claim 67, wherein the apparatus is further configured to:

ascertain whether the first application has been used less than the user-specified number of times; and again transmit the first application to the mobile terminal if the ascertaining step results in a determination of use of the first application less than the user-specified number of times.

69. The apparatus of claim 67, wherein the mobile terminal comprises a cellular telephone.

70. The apparatus of claim 67, wherein the first application is configured to become unavailable by becoming non-functional.

71. The apparatus of claim 67, wherein the first application is configured to become unavailable by automatically deleting at least a portion of itself.

\* \* \* \* \*